US008607165B2

(12) United States Patent
Lee et al.

(10) Patent No.: US 8,607,165 B2
(45) Date of Patent: Dec. 10, 2013

(54) MOBILE TERMINAL AND METHOD OF DISPLAYING MENU ICON THEREOF

(75) Inventors: Seong Cheol Lee, Seoul (KR); Min Taik Lim, Seoul (KR); Jun Hyuck Song, Seoul (KR)

(73) Assignee: LG Electronics Inc., Seoul (KR)

( * ) Notice: Subject to any disclaimer, the term of this patent is extended or adjusted under 35 U.S.C. 154(b) by 591 days.

(21) Appl. No.: 12/176,314

(22) Filed: Jul. 18, 2008

(65) Prior Publication Data

US 2009/0031253 A1   Jan. 29, 2009

(30) Foreign Application Priority Data

Jul. 26, 2007   (KR) .................. 10-2007-0075147

(51) Int. Cl.
*G06F 3/048* (2013.01)
(52) U.S. Cl.
USPC ............................. 715/835; 715/201; 715/765
(58) Field of Classification Search
USPC ......................................... 715/835, 201, 765
See application file for complete search history.

(56) References Cited

U.S. PATENT DOCUMENTS

| 5,638,438 | A | * | 6/1997 | Keen | 379/354 |
| 5,943,054 | A | * | 8/1999 | Hirano et al. | 715/827 |
| 6,020,916 | A | * | 2/2000 | Gerszberg et al. | 348/14.07 |
| 6,154,210 | A | * | 11/2000 | Anderson | 715/840 |
| 6,501,464 | B1 | * | 12/2002 | Cobbley et al. | 345/173 |
| 6,587,700 | B1 | | 7/2003 | Meins et al. | |
| 6,741,232 | B1 | * | 5/2004 | Siedlikowski et al. | 345/156 |
| 7,603,143 | B2 | * | 10/2009 | Kang et al. | 455/566 |
| 2005/0140649 | A1 | * | 6/2005 | Shudo et al. | 345/158 |
| 2008/0055263 | A1 | * | 3/2008 | Lemay et al. | 345/173 |
| 2008/0077873 | A1 | * | 3/2008 | Peterson | 715/764 |
| 2009/0140992 | A1 | * | 6/2009 | Tolaio | 345/173 |
| 2009/0167717 | A1 | * | 7/2009 | Wang et al. | 345/173 |
| 2009/0170553 | A1 | * | 7/2009 | Wang et al. | 455/550.1 |

FOREIGN PATENT DOCUMENTS

| KR | 10-1999-0048704 | 7/1999 |
| KR | 10-2006-0044063 | 5/2006 |
| WO | 0237254 | 5/2002 |

* cited by examiner

*Primary Examiner* — William Bashore
*Assistant Examiner* — Gregory A Distefano
(74) *Attorney, Agent, or Firm* — Lee, Hong, Degerman, Kang & Waimey

(57) ABSTRACT

A method for displaying icons on a portable device. The method includes displaying a first icon group including at least one icon on a touchscreen of the portable device, wherein at least one icon of the first icon group is selectable responsive to a detected presence of an input at a location proximate to a displayed location of the at least one icon, and displaying a second icon group including at least one icon on the touchscreen, wherein the at least one icon of the second icon group is selectable responsive to user contact with a mechanical input device, and wherein the selection of the at least one icon of the second icon group causes the first icon group to be displayed.

21 Claims, 11 Drawing Sheets

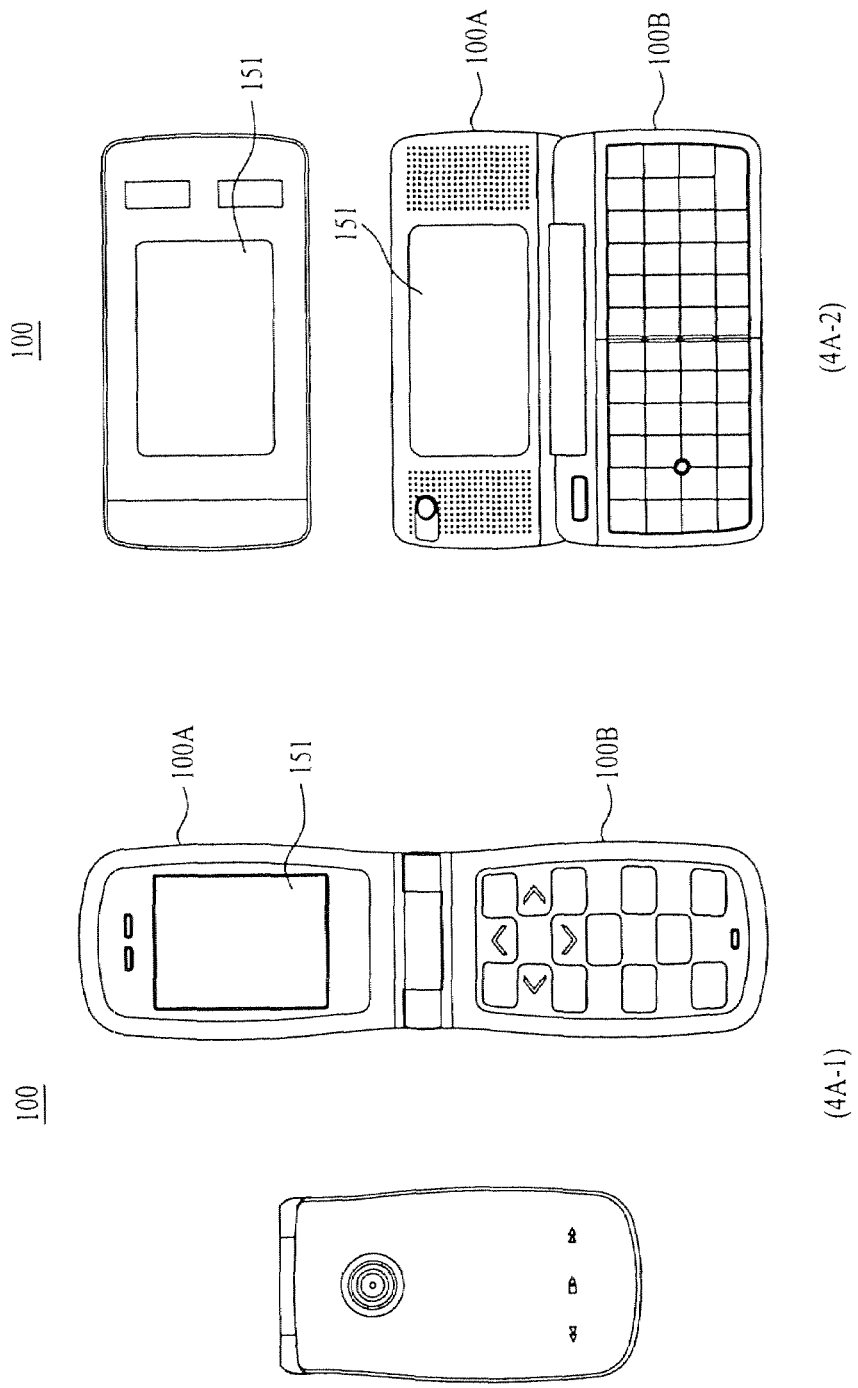

MOBILE TERMINAL AND METHOD OF DISPLAYING MENU ICON THEREOF

CROSS-REFERENCE TO RELATED APPLICATIONS

Pursuant to 35 U.S.C. §119(a), this application claims the benefit of earlier filing date and right of priority to Korean Application No. 10-2007-0075147, filed on Jul. 26, 2007, the contents of which are hereby incorporated by reference herein in its entirety

BACKGROUND OF THE INVENTION

1. Field of the Invention

The present invention relates to a mobile terminal and a method of displaying a menu icon.

2. Discussion of the Related Art

A mobile terminal is a device which may be configured to perform various functions, such as data and voice communications, capturing images and video via a camera, recording audio, playing music files via a speaker system, and displaying images and video on a display. Mobile terminals may also be configured as a game device or a multimedia device. Recently, mobile terminals have been configured to receive broadcast and multicast signals which allow a user to view videos and television programs.

When a mobile terminal is configured as a multimedia device, various menu icons may be displayed on a display screen. Each menu icon may perform one of the various functions associated with the mobile terminal. However, the various menu icons often cause confusion to a user of the mobile terminal.

Thus, there exists a need to provide the user with an easier method of accessing the various menu icons.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, an icon display method of a portable device is provided. The method includes displaying a first icon group including at least one icon on a touchscreen of the portable device, wherein at least one icon of the first icon group is selectable responsive to a detected presence of an input at a location proximate to a displayed location of the at least one icon, and displaying a second icon group including at least one icon on the touchscreen, wherein the at least one icon of the second icon group is selectable responsive to user contact with a mechanical input device, and wherein the selection of the at least one icon of the second icon group causes the first icon group to be displayed.

In one feature, the at least one icon of the first icon group is associated with a specific function of the portable device. The at least one icon of the second icon group is associated with a menu item of the portable device. Additionally, the at least one icon of the second icon group is not selectable via contact with the touchscreen. Furthermore, the detected presence of the input comprises user contact with the touchscreen.

In another feature, the at least one icon of the first icon group performs a first function when the icon is touched for a time less than a predetermined icon touch time and the at least one icon performs a second function when the icon is touched for a time greater than or equal to the predetermined icon touch time.

In yet another feature, the at least one icon of the first icon group may be selected via a key on the mechanical input device and an indicator corresponding to the key on the mechanical input device is displayed next to the at least one icon of the first icon group. The user may configure the at least one icon of the first icon group to be selectable via the touchscreen or the mechanical input device.

In still yet another feature, a menu for removing the at least one icon of the first icon group is displayed if the at least one icon is touched for a time greater than a predetermined icon touch time and the at least one icon of the first icon group may be removed from the first icon group. The portable device comprises an icon addition menu for adding the at least one icon to the first icon group. Additionally, the method further includes adding the most frequently used icon of the portable device to the first icon group.

In one embodiment a method for displaying icons on a portable device includes displaying a first icon group comprising at least one icon on a touchscreen of the portable device, wherein the at least one icon of the first icon group is selectable responsive to a detected presence of an input at a location proximate to a displayed location of the at least one icon, and displaying a second icon group comprising at least one icon on the touchscreen, wherein the at least one icon of the second icon group is only selectable responsive to user contact with a mechanical input device.

In another embodiment, a portable device for displaying icons is presented. The portable device includes a wireless communication unit for communicating with other terminals and devices, an audio and video input device for capturing audio and video, a key input unit for receiving input from a user, a sensing unit for sensing if the portable device is an open state or a closed state, an display unit for displaying icons, an audio output unit for output of audio, an interface unit for connecting external devices with the portable device, a power supply for supplying power to the portable device, and a control unit for controlling communications of the portable device and displaying a first icon group comprising at least one icon and a second icon group comprising at least one icon on the display unit.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein:

The accompanying drawings, which are included to provide a further understanding of the invention and are incorporated in and constitute a part of this application, illustrate embodiment(s) of the invention and together with the description serve to explain the principle of the invention. In the drawings:

FIG. 4A is a front perspective diagram of a folder-type mobile terminal according to an embodiment of the present invention.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Reference will now be made in detail to the preferred embodiments of the present invention, examples of which are illustrated in the accompanying drawings. Wherever possible, the same reference numbers will be used throughout the drawings to refer to the same or like parts.

The present invention is applicable to various kinds of terminals including a mobile phone, a smart phone, a broadcast receiving terminal, a PDA (personal digital assistant), PDA phone, a game player, a notebook computer, and a UMPC. For convenience and conciseness of the following description, the present invention uses a mobile phone as an illustration of a mobile terminal, and is not intended to limit the scope of the present invention.

Figure 1:
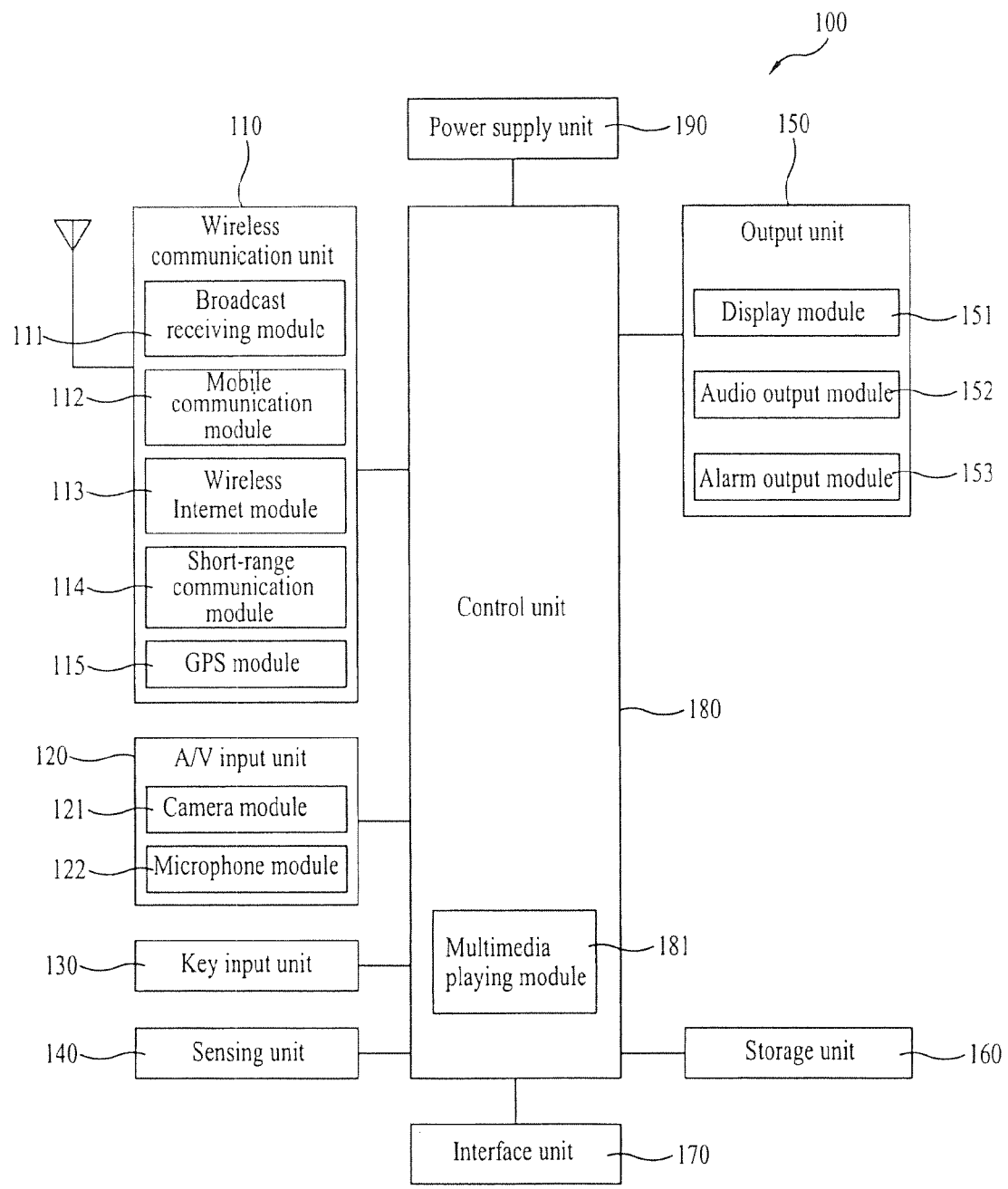
FIG. 1 is a block diagram of a mobile terminal according to an embodiment of the present invention.

FIG. 1 is a block diagram of a mobile terminal 100 according to one embodiment of the present invention. As shown in FIG. 1, a mobile terminal 100 includes a wireless communicating unit 110, an A/V (audio/video) input unit 120, a key input unit 130, a sensing unit 140, an output unit 150, a storage unit 160, an interface unit 170, a control unit 180, and a power supply unit 190.

The wireless communicating unit 110 includes a broadcast receiving module 111, a mobile communication module 112, a wireless Internet module 113, a short-range communication module 114, and a GPS (global positioning satellite) module 115.

The broadcast receiving module 111 receives a broadcast signal and broadcast information from an external broadcast managing server via a broadcast channel. The broadcast channel may be a satellite channel or a terrestrial channel.

A broadcast managing server transmits a broadcast signal and broadcast information. The broadcast managing server may also receive and transmit a previously generated broadcast signal and broadcast information.

The broadcast information may include information associated with a broadcast channel, a broadcast program, or a broadcast service provider. The broadcast signal may include a TV broadcast signal, a radio broadcast signal, and a data broadcast signal. The broadcast signal and broadcast information, which are received via the broadcast receiving module 111, may be stored in the storage unit 160.

The broadcast information may be sent via a mobile communication network such that the broadcast information may be received by the mobile communication module 112. The broadcast information may be sent via EPG (electronic program guide) of DMB (digital multimedia broadcasting) or ESG (electronic service guide) of DVB-H (digital video broadcast-handheld). The broadcast receiving module 111 is configured for all types of broadcast systems and is not limited to sending signals from the above-explained digital broadcast systems.

The broadcast receiving module 111 receives a broadcast signal using various broadcast systems. The broadcast receiving module 111 may receive digital broadcast signals via DMB-T (digital multimedia broadcasting-terrestrial), DMB-S (digital multimedia broadcasting-satellite), Media-FLO (media forward link only), DVB-H (digital video broadcast-handheid), or ISDB-T (integrated services digital broadcast-terrestrial). The broadcast receiving module 111 is configured for all types of broadcast systems and is not limited to receive signals from the above-explained digital broadcast systems.

The mobile communication module 112 transmits and receives wireless signals to and from at least one base station, external terminal, or server on a mobile communication network. The wireless signal may include an audio signal, a video communication call signal, or data formatted according to the multimedia message transmission and reception.

The wireless internet module 113 may be used for wireless internet access. The wireless internet module 113 may be an internal or external component of the mobile terminal 100.

The short-range communication module 114 may be used for short-range communication. Short-range communication technology may include Bluetooth, RFID (radio frequency identification), IrDA (infrared data association), UWB (ultra-wideband), or ZigBee. The GPS module 115 receives position information from a plurality of satellites.

The A/V input unit 120 is provided for audio or video signal input and may include a camera module 121 and a microphone module 122. The camera module 121 processes an image obtained in a video communication mode or a photographing mode by an image sensor. The processed image may be displayed on a display module 151.

The image processed by the camera module 121 is stored in the storage module 160 or may be externally transmitted via the wireless communicating unit 110. In an alternate embodiment, at least two camera modules 121 may be provided according to a configuration of the mobile terminal 100.

The microphone module 122 receives an external audio signal via a microphone in a phone-call mode, a recording mode, or a voice recognition mode. The audio signal is then processed into electrical audio data. During phone-call mode, the processed audio data is converted to a transmittable format via the mobile communication module 112 and then output to a mobile communication base station. The microphone module 122 may implement various kinds of noise removing algorithms to remove noise generated in the course of receiving the external audio signal.

The key input unit 130 generates key input data input for operational control of the mobile terminal 100 by a user. The key input unit 130 may include a keypad, a dome switch, a touchpad (static pressure/capacitance), a jog wheel, or a jog switch.

The sensing unit 140 senses the current status of the mobile terminal 100 as an open or close status, a position of the mobile terminal 100, and a presence or non-presence of user's touch. For example, the sensing unit 140 is capable of sensing whether a slide-type phone is open or closed. The sensing unit 140 also senses functions associated with a presence or non-presence of power applied to the power supply unit 190, and a presence or non presence of a connection between the interface unit 170 and an external device.

The interface unit 170 provides an interface for all external devices connected to the mobile terminal 100. For example, the interface unit 170 provides an interface with a headphone set, an external charger, a data port, an earphone, or a card socket, such as a memory card, a SIM/UIM card, audio I/O (input/output) ports, or video I/O ports. The interface unit 170 receives data or power from an external device and delivers the received data or power to the corresponding element of the mobile terminal 100. The interface unit 170 enables the transfer of data within the mobile terminal 100 to an external device.

The output unit 150 is provided for output of audio, video or an alarm signal. The output unit 150 may include a display module 151, an audio output module 152, and an alarm output module 153.

The display module 151 outputs display information processed by the mobile terminal 100. For example, the display module 151 displays information associated with a phone call, if the mobile terminal 100 is in a phone-call mode. The display module 151 displays an image or information associated with the phone call, if the mobile terminal 100 is in a video call mode or a photographing mode.

The display module 151 may be used as an input device in addition to an output device if the display module 13 is a touchscreen. The display module 151 may include at least one of a liquid crystal display, a thin film transistor-liquid crystal display, an organic light-emitting diode display, a flexible display, and a 3-dimensional display.

According to one embodiment of the present invention, the mobile terminal 100 may include at least two display modules 151. For example, the mobile terminal 100 may include an external display module (not shown in the drawing) and an internal display module (not shown in the drawing).

The audio output module 152 outputs audio data received from the wireless communicating unit 110 or stored in the storage unit 160. The audio data may be received in a call signal receiving mode, a phone-call mode, a recording mode, a voice recognition mode, or a broadcast reception mode. The audio output module 152 outputs an audio signal associated with a function executed by the mobile terminal 100. The audio output module 152 may include at least one of a speaker and a buzzer.

The alarm output module 153 outputs a signal for informing the user of the occurrence of an event of the mobile terminal 100. Events that may occur in the mobile terminal 100 include a call signal reception, a message reception, and a key signal input.

The output signal from the alarm output module 153 may be different from an audio or video signal. For example, the alarm output module 153 may output a vibration signal if a call or message is received in order to indicate the reception of the call or message. If a key is inputted, the alarm output module 153 may output a vibration as a feedback for the key signal input. A user is able to recognize the occurrence of an event through the vibration outputs. A signal for informing the user of the occurrence of an event may also be output via the display module 151 or the audio output module 152.

The storage unit 160 may store programs for processing and control of the mobile terminal 100 and execute a function for temporarily storing input and output data. The storage unit 160 includes at least one storage medium corresponding to a flash memory, a hard disc, a multimedia card micro-type memory, a card type memory, a RAM, and a ROM. The storage unit 160 may store data on the Internet via a web based storage system.

The control unit 180 controls overall operations of the mobile terminal 100. For example, the control unit 180 controls and processes voice phone calls, data communication, and video calls. The control unit 180 may include a multimedia playing module 181 for multimedia playback. The multimedia playing module 181 may include hardware within the control unit 180 or software separate from the control unit 180.

The power supply unit 190 receives external or internal power and supplies power for operation of the respective elements of the mobile terminal 100, under the control of the control unit 180.

In the above description, the mobile terminal 100 of the present invention is disclosed with reference to the elements according to their functions. The mobile terminal 100 will now be explained with reference to the exteriors of the elements.

The mobile terminal 100 may be implemented in different configurations. Examples of such configurations include slide-type (FIGS. 2 and 3), folder-type (FIGS. 4A-1 and 4A-2), bar-type (FIG. 4B-1), swing-type (FIG. 4B-2), and rotational-type (not shown). Further discussion will primarily relate to a slide-type mobile terminal.

Figure 2:
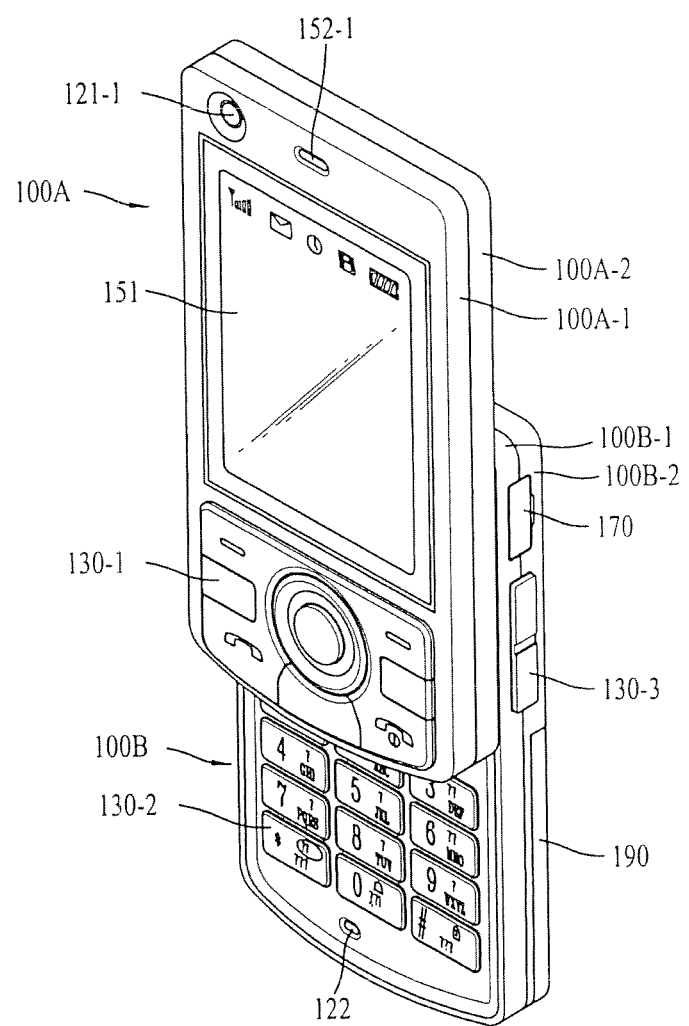
FIG. 2 is a front perspective diagram of a slide-type mobile terminal according to an embodiment of the present invention.

FIG. 2 is a perspective diagram of a slide-type mobile terminal 100 according to one embodiment of the present invention. As shown in FIG. 2, the mobile terminal 100 includes a first body 100A and a second body 100B configured to slide on the first body in at least one direction.

The mobile terminal 100 may be in a closed state, where the first body 100A is overlapped with the second body 100B or an open state, where the first body 100A exposes at least one portion of the second body 100B. The first body 100A moves relative to second body 100B between open and closed positions.

Figure 4B:
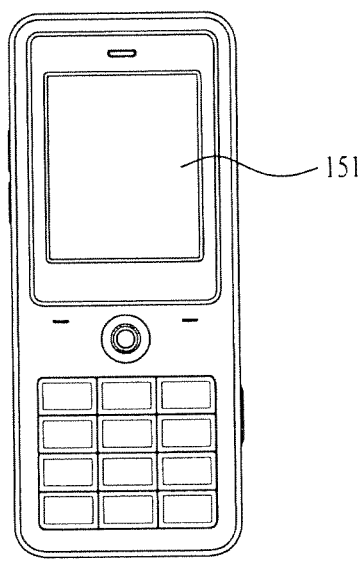
FIG. 4B is a front perspective diagram of a bar-type mobile terminal according to an embodiment of the present invention.
Figure 4C:
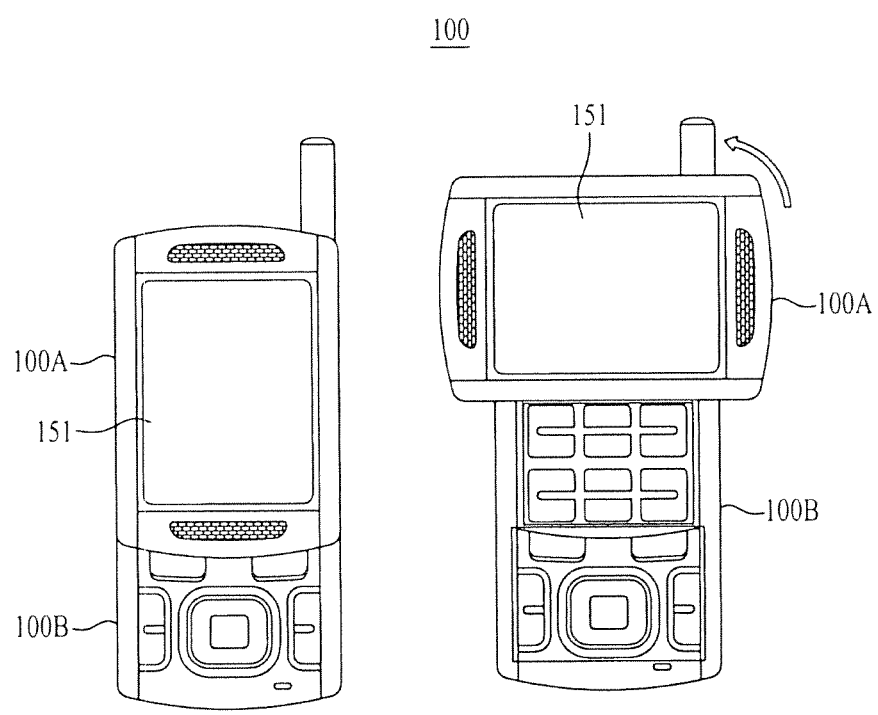
FIG. 4C is a front perspective diagram of a swing-type mobile terminal according to an embodiment of the present invention.

In a folder-type mobile terminal 100 shown in FIG. 4A, the first body 100A fold and unfolds relative to the second body 100B between the open state and the closed state. In a swing-type mobile terminal shown in FIG. 4C, the first body 100A swings relative to a second body 100B between the open state and the closed state.

The mobile terminal 100 is normally in a standby mode when in the closed state. The mobile terminal 100 is normally in a phone call mode when in the open state. The mobile terminal 100 may enter the standby mode in the open configuration either according to a user's manipulation or after a predetermined time.

A housing for the exterior of the first body 100A includes a first front case 100A-1 and a first rear case 100A-2. Various electronic components are located in a space formed by the first front case 100A-1 and the first rear case 100A-2. In one embodiment, at least one or more intermediate cases may be provided between the first front case 100A-1 and the first rear case 100A-2. The first front case 100A-1 and the first rear case 100A-2 may be formed by injection molding or formed of a metal based material containing stainless steel (STS) or titanium (Ti).

The first body 100A, and more particularly, the first front case 100A-1 may be provided with a display module 151, a first audio output module 152-1, a first camera module 121-1, and a first key input unit 130-1. The display module 151 has been explained in the above description in association with FIG. 1. Details of the display module 151 are omitted in the following description for conciseness.

The first audio output module 152-1 may be implemented with a speaker. The first camera module 121-1 may be implemented to enable a user to photograph a self-portrait still or moving picture. The first key input unit 130-1 may receive a command to control functions that are frequently used in the mobile terminal 100.

Similar to the first body 100A, a case for an exterior of the second body 100B is constructed with a second front case 100B-1 and a second rear case 100B-2. A second key input unit 130-2 may be provided on a front face of the second front case 100B-1. A third key input unit 130-3, a microphone module 122, and an interface unit 170 may be provided on at least one of the second front case 100B-1 and the second rear case 100B-2. The microphone module 122 may be implemented with a configuration suitable for receiving a user's voice or other sounds.

The first key input unit 130-1, the second key input unit 130-2, and the third key input 130-3 may be collectively referred to as the key input unit 130. The key input unit 130 may be implemented with a dome switch for receiving a command or information via a user's push, a touchpad for receiving a command or information by a user's touch, a wheel for rotating a key, a jog shuttle, or a joystick.

The first key input unit 130-1 is provided to allow the input of commands such as start, end, scroll, and direction. The second key input unit 130-2 is provided to allow the input of numerical figures, characters, and symbols. The third key input unit 130-3 may be a side key and operate as a hotkey to activate a special function within the mobile terminal 100.

The interface unit 170 allows the mobile terminal 100 to exchange data with an external device. Details of the interface unit 170 were previously provided in association with FIG. 1.

The power supply unit 190 is located in the second rear case 100B-2 in order to supply a power to the mobile terminal 100. The power supply unit 190 includes a chargeable battery and may be detachably attached for battery charging.

Figure 3:
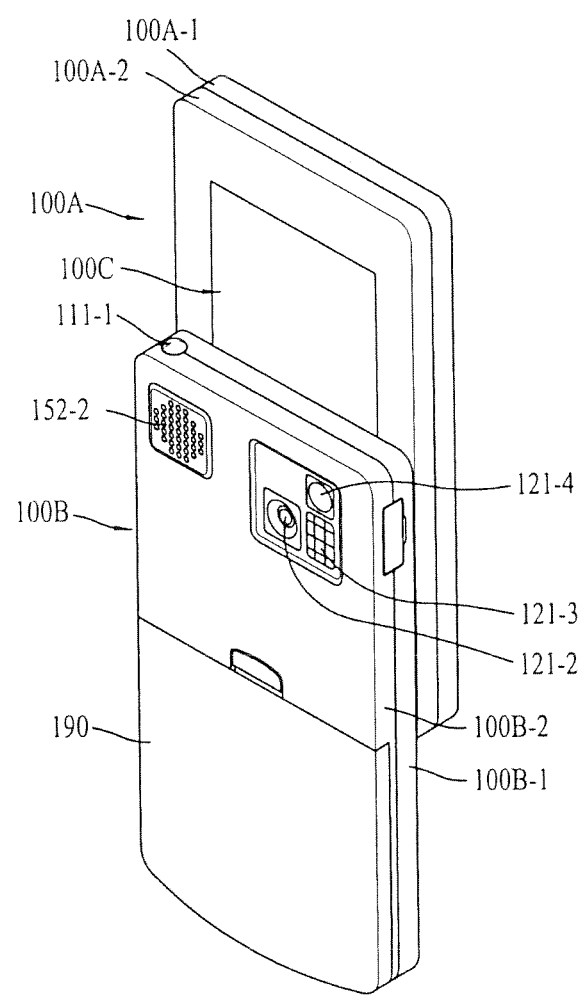
FIG. 3 is a rear perspective diagram of the mobile terminal shown in FIG. 2 according to an embodiment of the present invention.

FIG. 3 is a perspective diagram of a rear face of the mobile terminal 100 shown in FIG. 2. As shown in FIG. 3, a second camera module 121-2 may be additionally provided on a rear face of the second rear case 100B-2. The second camera module 121-2 has a photographing direction opposite to that of the first camera module 121-1 and may be defined by a different amount of pixels in comparison to the first camera module.

For example, the first camera module 121-1 may have a low pixel count, which creates lower bandwidth during a video communication. The second camera module 121-2 may include a high pixel count for photographing a normal subject when the photograph is not intended for immediate transmission.

A flash 121-3 and a mirror 121-4 may be additionally provided in the vicinity of the second camera module 121-2. The flash 121-3 flashes a light on a subject photographed by a user using the second camera module 121-2. The mirror 121-4 enables a user to look at his reflection when attempting to self-photograph himself.

A second audio output module 152-2 may be additionally provided on the second rear case 100B-2. The second audio output module 152-2 may implement a stereo function together with the first audio output module 152-1 and may be used for conversation in a speakerphone mode.

A broadcast signal receiving antenna 111-1 may be provided on one portion rear case 100B-2 as well as an antenna for communication. The antenna 111-1 table into the second body 100B.

One portion of a slide module 100C, which enables the first and second and 100B to be slidably assembled, is provided on the first rear case 100A-2 of the first body 100A. The other portion of the slide module 100C is provided on the second front case 100B-1 of the second body 100B, which is not externally exposed as shown in FIG. 3.

In the above description, the second camera module 121-2 is provided on the second body 100B. For example, at least one of the elements 111-1, 121-2, 121-3 and 152-2 that are illustrated as provided on the second rear case 100B-2 may be provided to the first body 100A, and more particularly, on the first rear case 100A-2.

It is advantageous that the elements provided on the first rear case 100A-2 are protected in a closed configuration. If the second camera module 121-2 is not provided, the first camera module 121-1 is rotatably provided to enable photographing in the direction of the second camera module 121-2.

Figure 5:
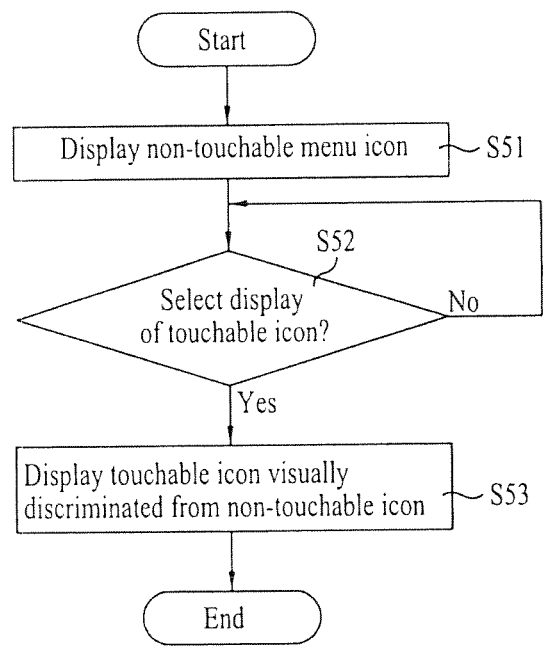
FIG. 5 is a flowchart of a method of displaying menu icons according to an embodiment of the present invention.

FIG. 5 is a flowchart of a method of displaying menu icons an embodiment of the present.

In the above description, the mobile terminal 100 is disclosed with reference to elements according to functions and exteriors. In the following description, a menu icon displaying method implemented in the mobile terminal 100 will be explained with reference to the accompanying drawings. In the following description, it is assumed that the display module 151 includes a touchscreen.

Figure 6:
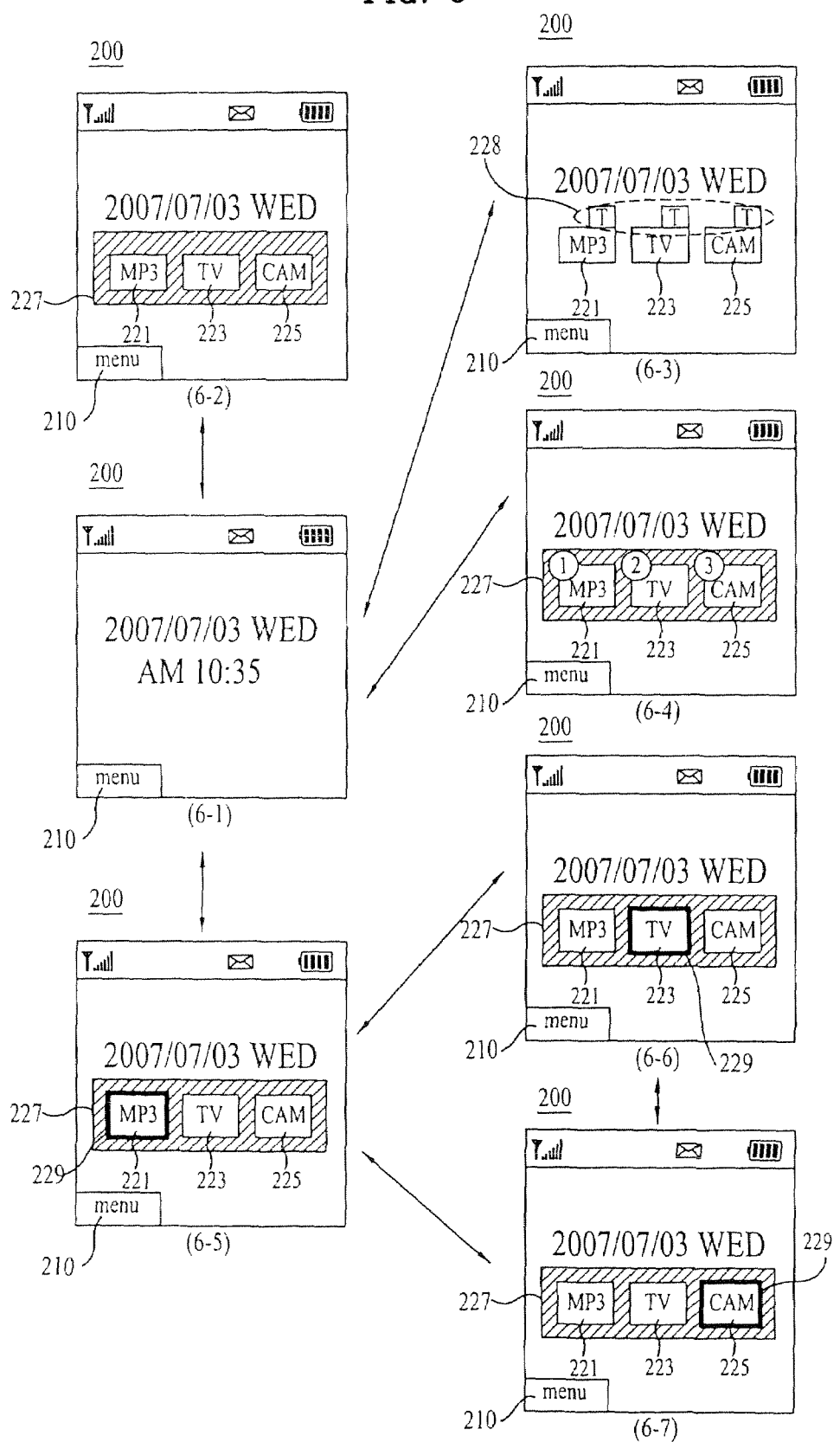
FIG. 6 is a diagram of a display screen of a mobile terminal according to an embodiment of the present invention.

FIG. 5 is a flowchart of a method of displaying menu icons according to an embodiment of the present invention. FIG. 6 is a diagram of a display screen of a mobile terminal 100, in which various icons are displayed according to an embodiment of the present invention As shown in FIG. 6, the touchscreen displays a standby screen 200. A menu icon 210 is displayed on the standby screen (S51). The menu icon 210 may be selected via the key input unit 130. The user is unable to select the menu icon 210 by touching the touchscreen.

Hereinafter, icons such as the menu icon 210 will be referred to as a non-touchable touchable icon. An icon that may be selected by touch, will be referred to as a touchable icon. the power supply unit 190 does not provide a current for detecting a touch made by a user to the touchscreen.

The user of the mobile terminal 100 may select a touchable icon activating key (not shown) provided on the key input unit 130 (S52). The touchable icon activating key may be configured as a side key in the third manipulating unit 131-3.

As shown FIG. 6-2, a plurality of touchable icons 221, 223 and 225 are displayed on the screen 200 (S53). The touchable icons 221, 223 and 225 are associated with main menu functions frequently used in the mobile terminal 100. The touchable icons may be registered in advance by a terminal manufacturer or the user.

A current supply for detecting a user's touch is initiated when the touchable icons 221, 223 and 225 are displayed. The user may execute a function of the mobile terminal 100 by touching one of the touchable icons 221, 223 and 225.

The touchable icons 221, 223 and 225 may be displayed such that the touchable icons are visually discriminated from the non-touchable icon 210 (S53). As shown in FIG. 6-2, the touchable icons 221, 223 and 225 are displayed on a non-transparent or semi-transparent background layer 227 that is visually discriminated from the non-touchable icon 210.

As shown in FIG. 6-3, a touch indicator 228 indicating touch-availability is displayed above each of the touchable icons 221, 223 and 225, whereby the touchable icons are visually discriminated.

It is not necessary that the touchable icons 221, 223 and 225 are selected only by a touch made to the touchscreen. The mobile terminal 100 may be configured such that some touchable icons may be selected via the touchscreen, while other touchable icons may be selected via the key input unit 130.

For example, as shown in FIG. 6-4, a number is given to each of the touchable icons 221, 223 and 225. A specific touchable icon 221, 223 and 225 may be selected if a corresponding number is pressed on the key input unit 130.

Figure 7:
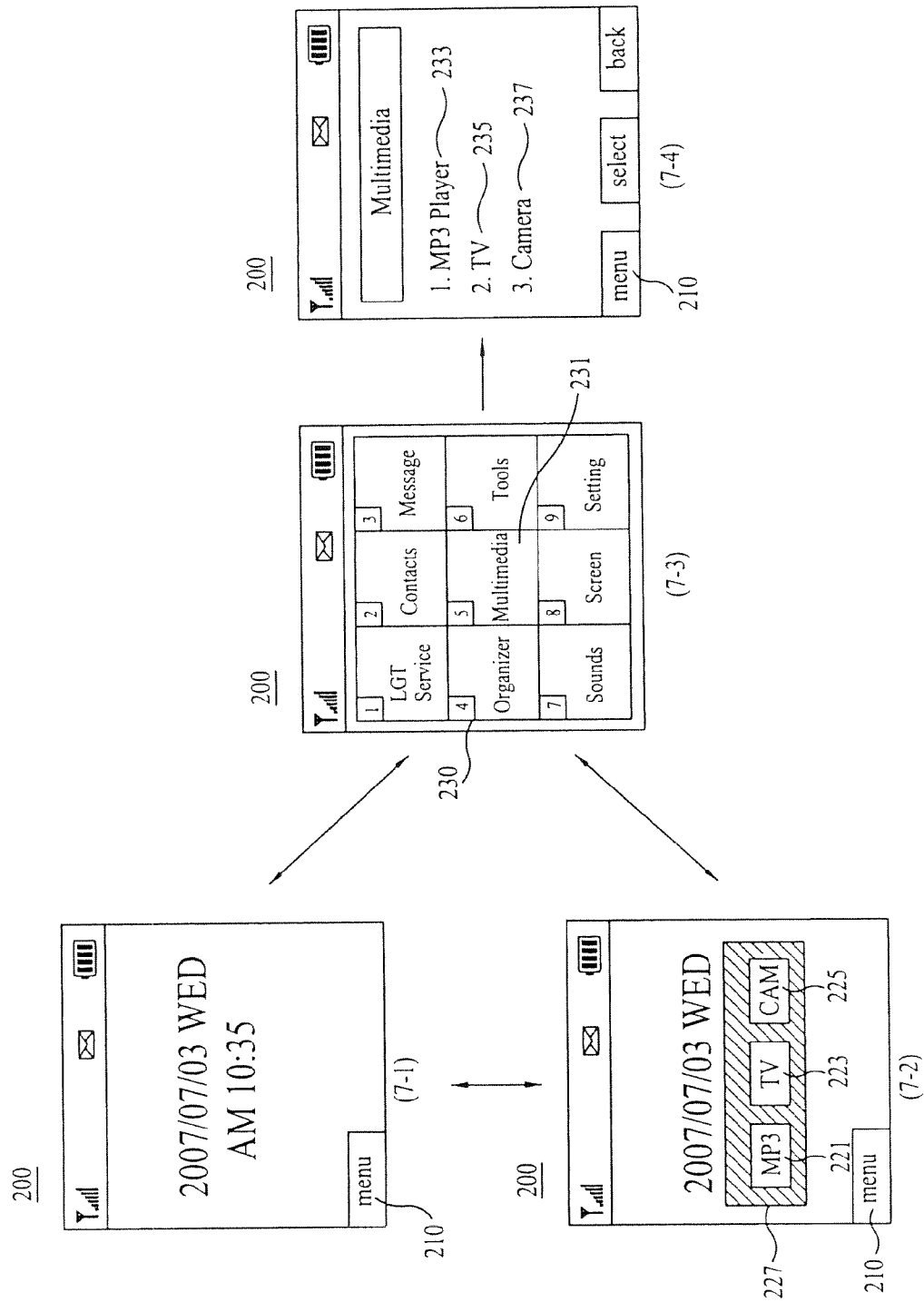
FIG. 7 is a diagram of a display screen of a mobile terminal according to an embodiment of the present invention.

As shown in FIGS. 6-5 to 6-7, a movable cursor 229 may be provided. A specific icon may be selected by moving the cursor 229 using the key input unit 130.

If the user presses the touchable icon activating key once again, the touchable icons 221, 223 and 225 may be configured such that they are no longer displayed on the screen 200. The current supplied for detecting the terminal user's touch is terminated when the touchable icons 221, 223 and 225 are no longer displayed.

Selecting the functions assigned to the touchable icons 221, 223 and 225 is not limited to using the touchscreen. FIG. 7 is a diagram of a display screen of a mobile terminal 100 which shows an implementation of an icon display method according to another embodiment of the present invention.

If the menu icon 210 is selected via the key input unit 130, as shown in FIGS. 7-1 and 7-2, the icons 230 for various functions within the mobile terminal 100 are displayed on the screen 200, as shown in FIG. 7-3.

If the user selects a multimedia icon 231 from the displayed icons 230, as shown in FIG. 7-4, an MP3 player icon 233, a TV icon 235 and a camera icon 237 are the screen 200. The displayed icons 233, 235, 237 correspond to the touchable icons 221, 223 and 225 shown in FIG. 7-2. The terminal user selects the icons 233, 235 and 237 shown in FIG. 7-4 via the key input unit 130 in order to execute the functions assigned to icons 221, 223, and 225.

Figure 8:
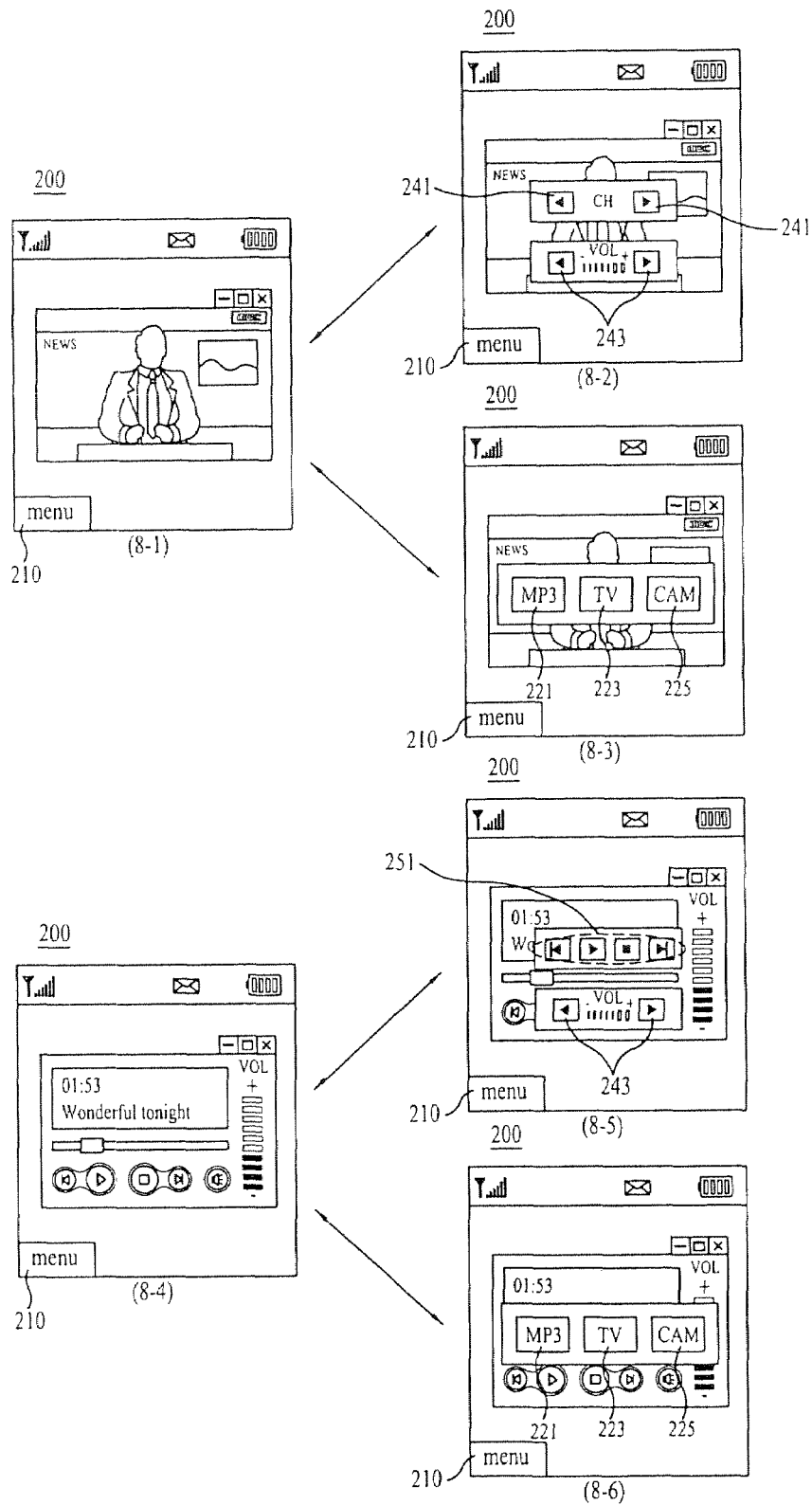
FIG. 8 is a diagram of a display screen of a mobile terminal according to an embodiment of the present invention.

More than one function may be associated with a touchable icon activating key in the mobile terminal 100. This is explained in detail with reference to FIG. 8. FIG. 8 is a diagram of a display screen of a mobile terminal 100 which shows an implementation of an icon display method according to another embodiment of the present invention.

As shown in FIG. 8-1, the mobile terminal 100 is displaying a TV signal. As shown in FIG. 8-2, touchable icons associated with the TV receiving function are displayed on the screen 200 if a user selects the touchable icon activating key for a period less than a predetermined time. A channel switching icon 241 and a volume adjusting icon 243 may be displayed on the screen 200. The user may switch a channel or adjust the volume by selecting a corresponding icon while watching TV.

As shown in FIG. 8-3, touchable icons associated with main menu functions of the mobile terminal are displayed on the screen 200, if the user selects the touchable icon activating key for a period greater than a predetermined time while the mobile terminal 100 is performing the TV receiving function. The user may execute a specific function in the course of watching TV.

As shown in FIG. 8-4, the mobile terminal 100 is performing a function of playing an audio file such as an MP3 file. As shown in FIG. 8-5, touchable icons associated with the audio file playback are displayed if the user selects the touchable icon activating key for a period less than a predetermined time. The touchable icons may include previous/stop/next music icons 251 and a volume adjusting icon 243.

Touchable icons associated with main menu functions of the mobile terminal 100 are displayed on the screen 200, as shown in FIG. 8-6, if the terminal user selects the touchable icon activating key for a period less than a predetermined time while the mobile terminal 100 is performing the audio file playing function as shown in FIG. 8-4.

Figure 9:
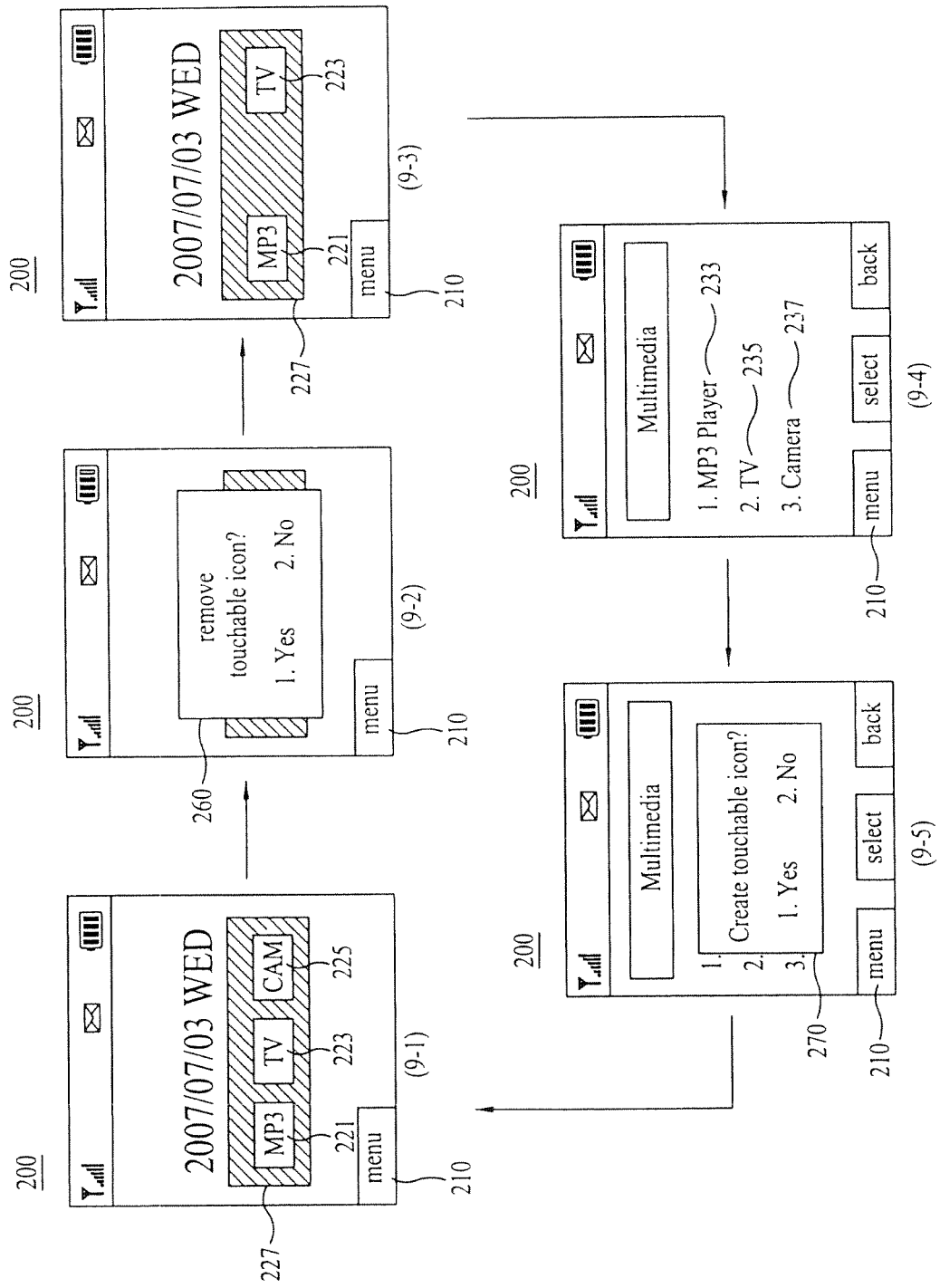
FIG. 9 is a diagram of a display screen of a mobile terminal according to an embodiment of the present invention.

The creation and removal of the touchable icons in the mobile terminal 100 may be performed by the terminal user. This is explained in detail with reference to FIG. 9. FIG. 9 is a diagram of a display screen of a mobile terminal 100 which shows an implementation of an icon display method according to an embodiment of the present invention As shown in FIG. 9-1, three touchable icons are displayed on the screen 200, specifically an MP3 icon 221, a TV icon 223, and CAM icon 225. A camera function is activated in the mobile terminal 100 if a user selects the CAM icon 225 for a period less than a predetermined time.

As shown in FIG. 9-2, an icon removal window 260 may be displayed if the terminal user touches the CAM icon 225 for a period greater than the predetermined time. The CAM icon is removed from the screen, as shown in FIG. 9-3, if the user selects '1. Yes' on the window 260.

As shown in FIG. 9-4, 'camera' 237 is selected using the menu icon 210 of the screen 200 to add a touchable icon for the camera function. The camera function is activated in the mobile terminal 100 if the user selects a corresponding key button of the key input unit 130 to select the camera icon 237 shown in FIG. 9-4 for a time less than a predetermined time. On the other hand, an icon creation window 270 is displayed, as shown in FIG. 9-5, if the user selects the corresponding button for a time greater than a predetermined time.

The CAM icon 225 is displayed as a touchable icon again on the screen 200, as shown in FIG. 9-1, if the terminal user selects '1. Yes' on the icon creation window 270.

In the above description, the function associated with selecting the touchable icon activating key or the corresponding key button for a period greater or less than a predetermined time may be exchanged.

Accordingly, the present invention provides several effects or advantages. The present invention controls an icon for frequently used menu functions to be displayed as a touchable icon to meet a user's request, thereby allowing the user to execute a specific menu function. A user may create a touchable icon with respect to a specific function in the terminal and remove the created or existing touchable icon. Finally, the present invention enables a power supply to provide a current to a touchscreen only if a touchable icon is displayed on the touchscreen, thereby minimizing power consumption.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. For instance, an execution count per menu function may be accumulated and recorded in the storage unit 160 of the mobile terminal 100 and icons for the predetermined number of most frequently used menu functions may be displayed as touchable icons on the screen 200.

What is claimed is:

1. An icon display method of a portable device, the icon display method comprising:
  displaying a first icon group on a touchscreen of the portable device, the first icon group including at least one icon, the at least one icon being selectable via an input received on the touchscreen;

displaying a second icon group on the touchscreen concurrently with the first icon group, the second icon group including at least one icon, the at least one icon being selectable only via an input received on a key input unit;

enabling the touchscreen to detect a touch, when the first icon group is displayed on the touchscreen; and disabling the touchscreen from detecting a touch by not providing the touchscreen with a current for detecting the touch, in response to the first icon group being no longer displayed on the touchscreen, wherein the first icon group is visually distinguishable from the second icon group.

2. The icon display method of claim 1, wherein the at least one icon of the first icon group is associated with a specific function of the portable device.

3. The icon display method of claim 1, wherein the at least one icon of the second icon group is associated with a menu item of the portable device.

4. The icon display method of claim 1, further comprising:
performing a first function, when the at least one icon of the first icon group is selected for less than a predetermined time; and
performing a second function, when the at least one icon of the first icon group is selected for a time greater than or equal to the predetermined time.

5. The icon display method of claim 1, wherein the at least one icon of the first icon group is further configured to be selectable via a key on the key input unit and to be displayed in proximity to an indicator corresponding to the key.

6. The icon display method of claim 1, wherein the user may configure the at least one icon of the first icon group to be selectable via the touchscreen or the key input unit.

7. The icon display method of claim 1, further comprising displaying a menu for removing the at least one icon of the first icon group, if the at least one icon is selected for a time greater than a predetermined time.

8. The icon display method of claim 1, further comprising displaying on the touch screen an icon addition menu configured to add an icon to the first icon group.

9. The icon display method of claim 1, further comprising adding a most frequently used icon of the portable device to the first icon group.

10. A method for displaying icons on a portable device, the method comprising:
displaying a first icon group on a touchscreen of the portable device, the first icon group including at least one icon, the at least one icon being selectable via an input received on the touchscreen;
displaying a second icon group on the touchscreen concurrently with the first icon group, the second icon group including at least one icon, the at least one icon being selectable only via an input received on a key input unit;
enabling the touchscreen to detect a touch, when the first icon group is displayed on the touchscreen; and
disabling the touchscreen from detecting a touch by not providing the touchscreen with a current for detecting the touch, in response to the first icon group being no longer displayed on the touchscreen.

11. The method of claim 10, wherein the at least one icon of the first icon group is associated with a distinct function of the portable device.

12. The method of claim 10, wherein the at least one icon of the second icon group is associated with a menu item of the portable device.

13. The method of claim 10, wherein:
enabling the touchscreen to detect the touch includes providing the touchscreen with the current for detecting the touch, when the first icon group is displayed on the touchscreen.

14. A portable device for displaying icons, the portable device comprising:
a wireless communication unit configured to communicate with devices;
a key input unit configured to receive input from a user;
a touchscreen configured to display at least one icon;
an audio output unit configured to output audio;
a power supply configured to supply power to the portable device; and
a control unit configured to control the portable device, wherein the control unit is further configured to:
control the touchscreen to display a first icon group on the touchscreen, the first icon group including at least one icon, the at least one icon being selectable via an input on the touch screen,
control the touchscreen to display a second icon group on the touch screen concurrently with the first icon group, the second icon group including at least one icon, the at least one icon being selectable only via an input received on the key input unit, and
enable the touchscreen to detect a touch, when the first icon group is displayed on the touchscreen; and
disable the touchscreen from detecting a touch by not providing the touchscreen with a current for detecting the touch, in response to the first icon group being no longer displayed on the touchscreen.

15. The portable device of claim 14, wherein the portable device further comprises:
a sensing unit configured to sense if the portable device is an open state or a closed state;
a first body and a second body, the first body sliding relative to the second body such that the first body overlaps the second body in the closed state and a portion of the second body is exposed in the open state.

16. The portable device of claim 14, wherein the portable device further comprises:
a sensing unit configured to sense if the portable device is an open state or a closed state; and
a first body and a second body, the first body folding and unfolding relative to the second body.

17. The portable device of claim 14, wherein the portable device further comprises a front housing unit and a rear housing unit coupled together with the components of the portable device housed between the front housing unit and rear housing unit.

18. The portable device of claim 14, wherein the portable device comprises:
a sensing unit configured to sense if the portable device is an open state or a closed state; and
a first body and a second body, the first body configured to swing at a ninety degree angle relative to the second body.

19. The portable device of claim 14, wherein controller is further configured to enable the touchscreen to detect the touch only when the first icon group is displayed on the touchscreen.

20. The portable device of claim 14, wherein the first icon group is visually distinguishable from the second icon group.

21. The portable device of claim 14, wherein the key input unit comprises a keypad, and wherein the at least one icon of the first icon group is selectable via an input received on the keypad and the controller is further configured to control the touchscreen to display an indicator corresponding to a key on the keypad next to the at least one icon of the first icon group.

* * * * *